July 23, 1957  H. G. BAERWALD ET AL  2,800,647
ICE DETECTOR

Filed March 18, 1955  2 Sheets-Sheet 1

INVENTORS
HANS G. BAERWALD
BY EDWARD G. THURSTON

William J. Flynn
ATTORNEY

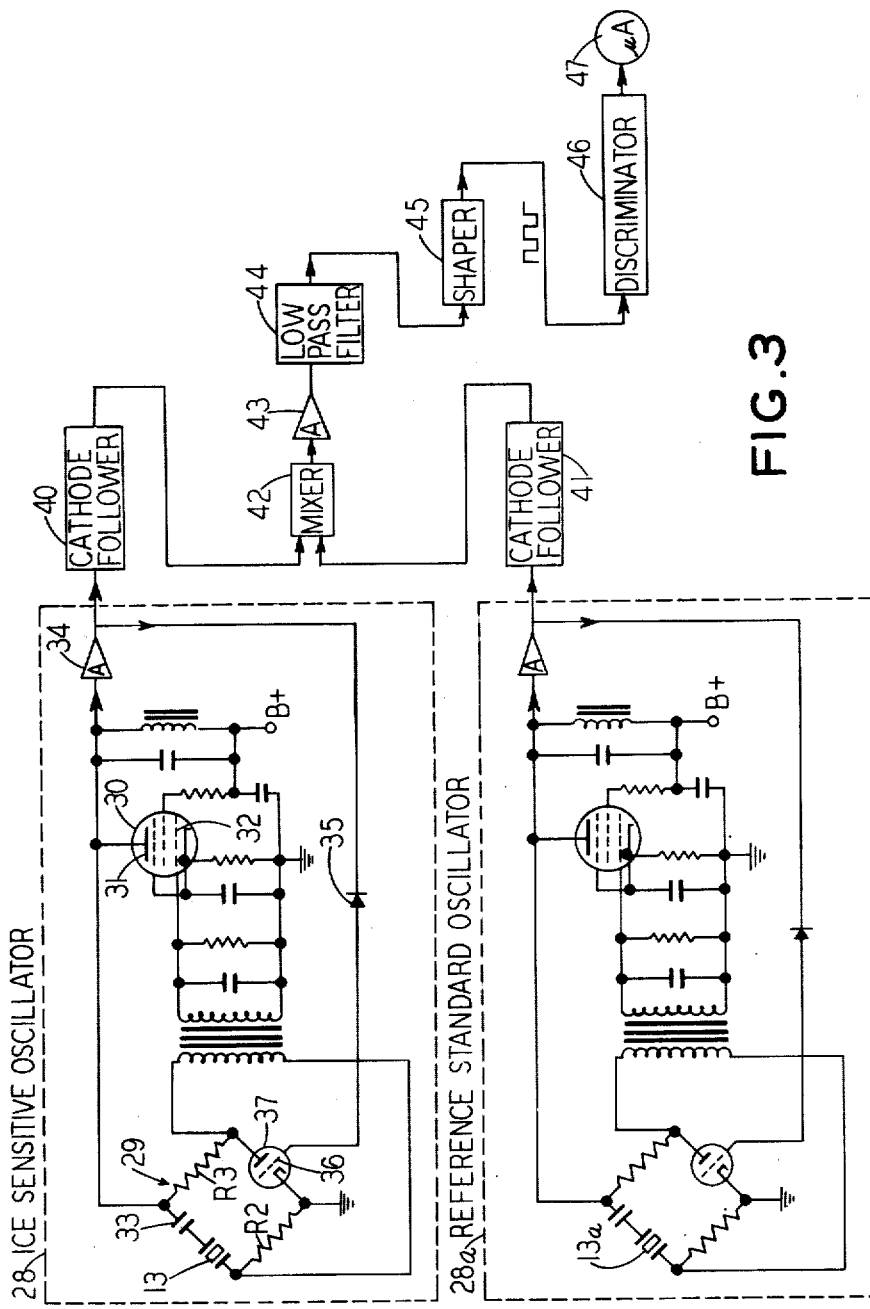

United States Patent Office 2,800,647
Patented July 23, 1957

2,800,647
ICE DETECTOR

Hans George Baerwald and Edward G. Thurston, Cleveland, Ohio, assignors to Clevite Corporation, Cleveland, Ohio, a corporation of Ohio Application March 18, 1955, Serial No. 495,310

11 Claims. (Cl. 340—234)

This invention relates to a device for detecting and measuring quantitatively the accretion of ice on a surface.

In the past, various devices have been proposed for detecting the formation of ice on an exposed surface. One important use for such ice detectors is on aircraft to indicate the formation of ice on the wings and other critical exposed surfaces. It has been found that the prior ice indicators are not entirely satisfactory because of their tendency to give spurious indications of ice formation. Also, there has existed prior to the present invention a need for a reliable device capable of quantitatively measuring the thickness of an ice layer which deposits on an exposed surface.

It is an object of the present invention to provide a novel and improved device for indicating the formation of ice on a surface.

It is also an object of this invention to provide a novel and improved device for quantitatively measuring the accretion of ice on a surface.

Another object of this invention is to provide a novel device which is particularly adapted for indicating and quantitatively measuring the formation of ice on an exposed surface of an airship.

A further object of this invention is to provide a novel ice detector and a mounting therefor which simulates the surface contour and aerodynamic and thermal conditions of the surface on which it is desired to determine the ice accretion, thereby enabling the ice detector to indicate more accurately the actual condition of ice formation on that surface.

Other and further objects and advantages of the present invention will be apparent from the following description of a preferred embodiment of this invention, illustrated in the accompanying drawings.

In the drawings:

Figure 3 is a diagram of the preferred form of electrical circuit for the present ice detector.

Figure 1:
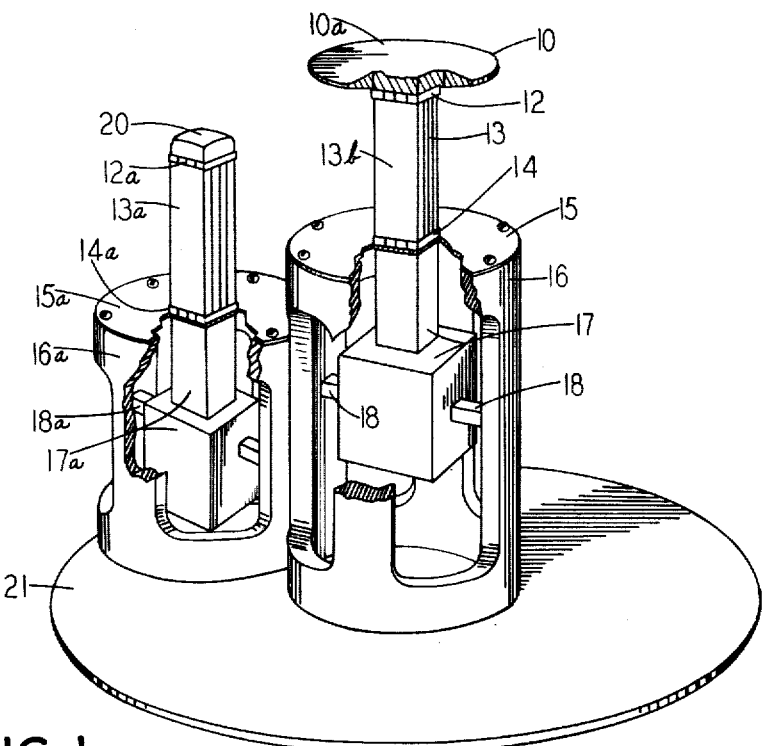
Figure 1 is a fragmentary perspective view, with parts broken away, showing the vibrating units in the present ice detector.
Figure 2:
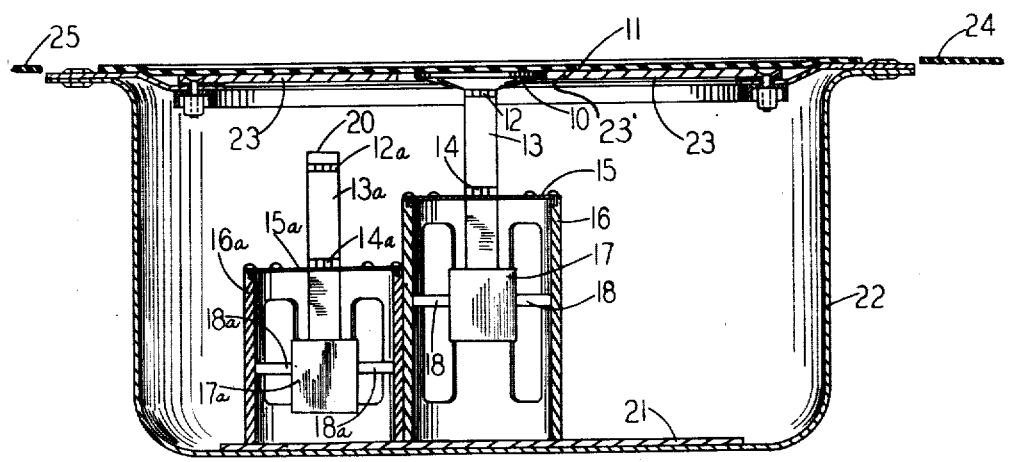
Figure 2 is a section showing the vibrating units positioned in relation to the surface exposed to ice formation.

In accordance with the present invention there is provided a first vibrating unit exposed to the mass loading effect of deposited ice and a second similar vibrating unit which is not so exposed and which serves as a frequency standard for the first unit. Referring to Figures 1 and 2, the first vibrating unit comprises a tapered disc 10 which presents a flat outer face 10a of appreciable area which is cemented to the inside surface of a fabric covering 11 (Figure 2), which is exposed to the formation of ice. At its reduced diameter inner end the disc 10 is attached to an assembly of adjacent quartz strips 12 which, in turn, are mounted on the upper end of a stack of ammonium dihydrogen phosphate piezoelectric crystal plates 13, the length dimension of each quartz strip 12 being parallel to the thickness dimension of the piezoelectric plates 13. The lower end of the stack of crystal plates 13 is mounted on a second assembly of quartz strips 14 extending parallel to the quartz strips 12 of the first assembly. The quartz strips 14 are affixed to the upper face of a thin Phosphor bronze sheet 15. This sheet is secured at its periphery to a supporting cylinder 16 which provides the physical support for this vibrating unit. Attached to the underside of the sheet 15 is a terminating equivalent quarter-wave bar 17. This terminating bar is cemented to rubber supporting members 18 attached to the cylindrical support 16, these supporting members being extremely compliant in the direction in which the disc 10 vibrates (vertically in Figures 1 and 2). The crystal plates 13 are suitably electroded on their major faces 13b and the application of a voltage across the electrodes causes these crystal plates and disc 10 to vibrate in unison at a resonant frequency determined by the geometry and elastic constants of the stack of crystal plates 13, the mass of disc 10, and the action of equivalent quarter wave termination 17. The assembly of quartz strips 12 provides a connection between the crystal plates 13 and disc 10 which is rigid in the direction in which the unit vibrates. Also, the assembly of quartz strips 14 provides a similar rigid connection between the crystal plates 13 and the sheet 15 and terminating bar 17.

The disc 10 is used to increase the sensitivity of the vibrating unit by increasing the area over which the accumulation of ice can be sensed. For high sensitivity (sensitivity being defined as the total change in the resonant frequency of the unit for a given thickness of ice deposited) this disc should have an area subjected to the mass loading effect of the ice which is large relative to the cross-sectional area of the crystal stack 13, as well as a small static mass. These requirements are satisfied by the particular shape of disc 10 which presents a relatively large area face 10a subjected to the loading effect of ice and a tapered construction away from this face which reduces the mass of the disc.

The desired action as described is obtained only for such vibrational frequencies for which the disc 10 represents essentially a lumped mass. This is obtained only if the lowest flexural resonance frequency of the disc 10 supported at its smaller area end is sensibly higher than that of the vibrating unit with the disc 10 considered as lumped mass. The ratio of these two frequencies should be at least approximately two. This requirement, coupled with the sensitivity requirement, necessitates care in the design of the disc in order to achieve good performance. This is due to the fact that the lowest flexural resonance of such a disc is a direct function of the thickness and an inverse function of the area. On the other hand, the total change in equivalent mass of the vibrating unit due to ice accretion will be a direct function of the area, but in terms of sensitivity this mass change must be compared to the effective mass of the vibrating unit without any ice accretion. The latter is a function of the equivalent mass of the stack of crystal plates 13 (referred to the point of attachment of disc 10) and the mass of the disc 10.

For this reason, beryllium is preferred as the material for the disc 10, even though it is a rather costly material. It is obvious that it is desirable to make the ratio of the area of the broad face of the disc to the mass of the disc as large as possible and also to have the density of the material of the disc as low as possible. Since the resonant frequency of such a disc in flexure is a direct function of the velocity of sound in the disc (i. e. a function of the square root of the ratio of the Young's modulus of the material to the density of the material), a material which has a maximum value for this quantity would be most suitable. Beryllium exceeds all other materials in this regard by nearly a factor of five, so that its use is well justified.

While less desirable, aluminum is also suitable as the material for the disc 10 since it also has a rather high velocity of sound.

The disc is of tapered construction in order to reduce its mass without lowering the resonant frequency of the disc.

In one practical embodiment, the disc 10 is of beryllium, with a radius of approximately 1 inch at its outer edge, a central thickness of $\frac{3}{16}$ inch, a radius at its attachment to the stack of crystal plates of $\frac{3}{8}$ inch, and an edge thickness of approximately $\frac{1}{5}$ its central thickness. In this embodiment, the stack of crystal plates 13 consists of four crystal plates each $1\frac{1}{2}'' \times \frac{1}{2}'' \times \frac{1}{8}''$ thick, giving a stack totaling $1\frac{1}{2}'' \times \frac{1}{2}'' \times \frac{1}{2}''$. Ammonium dihydrogen phosphate was chosen as the piezoelectric crystal material because it combines a rather high piezoelectric coupling coefficient with fairly good frequency stability.

The two assemblies of quartz strips 12 and 14 on opposite ends of the crystal stack are provided primarily to insulate the ammonium dihydrogen phosphate crystal plates 13 from the beryllium disc 10 and from the terminating aluminum bar 17 dielectrically. This is necessary because the dielectric constant of the crystal plates 13 in a direction parallel to the plane of their electrodes is about four times that in the direction perpendicular to the plane of the electrodes. Quartz is most suitable for this purpose because it has a low dielectric constant and a relatively high stiffness and thus will not tend to introduce excessive "dead" compliance.

Another desirable effect is obtained from the assembly of quartz strips by having their long dimension parallel to the thickness dimension of the ammonium dihydrogen phosphate crystal plates so that the ammonium dihydrogen phosphate crystal plates are substantially unrestrained in the direction perpendicular to both the long axis of the crystal plates and to their thickness. This reduces the tendency to prevent "Poisson breathing," which is particularly large due to the excessive value of the Poisson cross ratio of ammonium dihydrogen phosphate in the plane perpendicular to the Z axis; such clamping would tend to reduce the effective piezoelectric coupling coefficient and thus the system's sensitivity.

Theoretically, for ideal results the stack of crystal plates 13 should be rigidly, axially fixed at its lower end, remote from the beryllium disc 10. However, this would be quite difficult to achieve in practice, and the expedient of an equivalent quarter-wave terminating bar 17 attached to this end of the crystal stack is resorted to in order to provide a very high mechanical impedance at this point. Since the resonant frequency of this vibrating unit will vary with the accumulation of ice, it is impossible to provide a terminating bar which will be exactly resonant under all conditions. The terminating bar should be so designed that its resonant frequency is the mean of the extreme operating frequencies of no-ice load and maximum ice load. In this case, the mechanical impedance offered to the crystal stack by the terminating bar will be very large throughout the useful frequency range. In order to reduce the physical length of the terminating bar in the illustrated embodiment, it is of two-piece construction, its cross-sectional area at its lower end being approximately four times that of its upper end. The terminating bar 17 constructed in this manner behaves effectively as the equivalent of a bar of uniform cross-section and a full quarter-wave length long.

The provision of the supporting members 18 and the Phosphor bronze disc 15 enhances the resistance of the vibrating unit to longitudinal shocks without introducing excessive losses.

The other vibrating unit is essentially identical to the above-described unit, except that in place of the beryllium disc 10 it carries a small piece of lead 20 having a mass approximately equivalent to that of the beryllium disc.

This unit comprises a stack of four electroded ammonium dihydrogen phosphate crystal slabs 13a, with an assembly of quartz strips 12a being located between the upper end of this stack and the lead piece 20. The lower end of the crystal stack 13a is attached to an assembly of quartz strips 14a, which in turn are mounted on a thin Phosphor bronze plate 15a peripherally supported by a supporting cylinder 16a. An equivalent quarter-wave bar 17a is attached to the underside of the Phosphor bronze plate 15a. Supporting members 18a mounted on the inner side of the support cylinder 16a engage and support the equivalent quarter-wave bar 17a.

Both support cylinders 16 and 16a are mounted on a plate 21 affixed to the bottom of a container 22. A cover plate 23, suitably mounted on the top of container 22, contains an aperture 23' somewhat larger than beryllium disk 10. A fabric sheet 11 extends across the top cover plate 23 and is attached to the outer face of the beryllium disc 10. A fabric sheet 11 extends across top cover plate 23 and is attached to the outer face of disk 10 as permitted by aperture 23' in which the disk is disposed. Fabric sheet 11 is mounted so as to be exposed to the accumulation of ice, and the mass of the accumulated ice is sensed by the vibrating system. The second vibrating system is disposed completely within the container 22 and is shielded thereby from the accumulation of ice, so that its resonant frequency of vibration does not change in response to the accretion of ice on the fabric cover 11.

It is particularly important that the fabric or other member 11, to which the broad face of disc 10 is connected, simulate, with respect to contour and thermal properties, the extended surface on which it is desired to determine the ice accretion. To this end, in Figure 2 the mounting of the unit is such that the exposed bounded fabric area 11 forms a smooth continuation, as nearly as possible, of adjacent portions 24 and 25 of the extended surface. The bounded area 11 should also simulate closely the thermal properties of the extended surface, so that there is no substantial thermal discontinuity. With this novel mounting arrangement, the conditions of ice formation at the point of measurement (i. e. on bounded fabric area 11) are substantially identical with those throughout the other portions of like geometry on the extended surface. The factor of substantial continuity and similarity of surface contour insures that the aerodynamic conditions affecting the formation of ice are not disturbed. Also, by making the bounded area at the point of measurement thermally similar to the extended surface, the heat exchange and other thermodynamic properties are substantially the same at the point of measurement and elsewhere on the extended surface. Thus, ice formation on the bounded area at the point of measurement is representative of ice formation on the extended surface, for example, the surface of an airship or airplane, in the general vicinity of the detector.

For determining the change in the resonant frequency of the vibrating unit which senses the accumulation of ice, the vibrating units are connected in the electrical circuit indicated schematically in Figure 3. Referring to this figure, the stack of crystal slabs 13 in the sensing vibrating unit forms part of the impedance in one arm of a "Meacham bridge" type oscillator circuit 28. The stack of crystal slabs 13a in the non-exposed vibrating unit is similarly connected in a second oscillator circuit 28a of the same type.

As shown in Figure 3, the oscillator circuit 28 comprises a 6AK5 pentode 30 having tuned grid and plate circuits. Feedback from the plate 31 of this tube to the first control grid 32 is by way of the bridge 29 in which the vibrating crystal stack 13, in series with a capacitor 33 of the order of .1 microfarad, forms one impedance arm. In this feedback circuit a portion of the output from tube 30, after amplification by the amplifier 34, is rectified by a half-wave rectifier such as a diode 35 and is then applied as a negative bias to the control grid 36 of a triode 37, which forms the impedance arm in the bridge 29 opposite the impedance arm which includes the vibrating stack of crystals 13. With this feedback arrangement, tube 37 presents a resistive impedance in the bridge which varies with the amplitude of the oscillations produced in oscillator 28, thereby acting to sustain the oscillations under various conditions of loading of the sensing vibrating unit. Bridge 29 is essentially a Wheatstone bridge, in which the resistive impedance of the resonating stack 13 increases with the deposition of ice and the resistive impedance of tube 37 varies with the amplitude of the oscillations. As pointed out in the article on the basic "Meacham bridge" oscillator in "Proceedings of the Institute of Radio Engineers," October 1938, pp. 1278–1294, for oscillations to be sustained, the resistive impedance presented by tube 37 should be slightly smaller than the ratio $$\frac{R_3 \cdot R_2}{R_{13}}$$

where $R_{13}$ is the resistive impedance of the stack of crystals 13, and $R_2$ and $R_3$ are the fixed resistors in the bridge 29 so designated in Figure 3. This condition is maintained in the Figure 3 circuit since the feedback to tube 37 causes its resistance to vary with the variations in the resistive impedance of crystals 13 due to the loading effect of the ice.

A portion of the output from the oscillator tube 30 is also fed through a cathode follower 40 to the measuring circuit.

In the operation of oscillator 28, the stack of crystal plates 13 in the vibrating unit which is exposed to the formation of ice is the frequency controlling element. In one embodiment, with no ice load the equivalent resistive impedance of the stack of crystal plates 13 is approximately 20,000 ohms. At full ice loading, with an ice coating .050 inch thick on the fabric 11 to which the disc 10 is attached, the equivalent resistive impedance of this crystal stack is about 80,000 to 90,000 ohms. At intermediate stages of ice loading the equivalent resistive impedance of this crystal stack assumes ohmic values between these extremes. Thus, the operation of tube 37 described above is necessary to sustain oscillation under such relatively large changes in the resistive impedance of the crystal stack.

The other Meacham bridge type oscillator $28a$, in which the stack of vibrating crystals $13a$ is the frequency controlling element, has its output signal fed into a cathode follower 41. Oscillator $28a$ is essentially the same as oscillator 28, except that its oscillation frequency is slightly different (about 100 cycles per second higher) from the no-ice load oscillation frequency of oscillator 28.

The respective outputs from the cathode followers 40 and 41 are fed into a mixer 42, which may comprise a multiple grid tube in which one input signal is applied to each control grid. The output from this mixer is amplified by an amplifier 43 and passed through a low pass filter 44, which rejects the sum frequency signal and passes the difference frequency signal. This difference frequency signal is then shaped by suitable shaping circuits 45 into substantially a square wave and is fed into a counter type discriminator 46, which produces an output signal having an amplitude substantially proportional to the frequency of the difference frequency signal. The output from the discriminator is connected to a micro-ammeter 47.

Normally, in the absence of ice accumulation on the exposed vibrating unit, the respective frequencies of vibration of the crystals 13 and $13a$ are different by a predetermined amount, so that the Meacham bridge type oscillators oscillate at somewhat different frequencies and when these output signals are mixed they produce a difference frequency signal of about 100 c. p. s. A potentiometer is provided to adjust the "zero" calibration associated with this condition of no ice load. It is advisable to have such a no load frequency difference to avoid the possibility of "lock in" due to stray coupling between the oscillators.

When a mass of ice accumulates on the fabric cover 11 and imposes a load on the beryllium disc 10 driven by the vibrating crystal stack 13, this reduces the frequency of vibration of the crystal stack 13 in proportion to the mass of accumulated ice. The vibrating crystal stack 13 in turn changes the frequency of oscillation of the corresponding oscillator which results in a progressively greater difference frequency signal as the ice load increases. The micro-ammeter 47 then indicates a proportional deflection and therefore can be calibrated directly in lbs. per sq. ft. or inches of thickness of ice load.

From the foregoing it will be apparent that the specific arrangement described above in detail and illustrated in the accompanying drawing is particularly well adapted to accomplish the purposes of this invention. However, it is to be understood that, while there has been described above and illustrated in the accompanying drawings a specific preferred embodiment of this invention, various modifications, omissions and refinements which depart from the disclosed embodiment may be adopted without departing from the spirit and scope of this invention.

We claim:

1. In an ice detector, the combination of a substantially rigid disc of a material having a high velocity of sound, said disc tapering inwardly from a larger outer surface to a smaller inner surface, means mounting said disc to subject the outer surface of the disc to the loading effect of ice, electromechanical transducer means rigidly connected to the inner surface of said disc, and means for exciting said electromechanical transducer means to vibrate with said disc in system resonance.

2. In an ice detector, the combination of a substantially rigid beryllium disc tapering from a larger outer surface inwardly to a smaller inner surface, means mounting said disc to subject the outer surface of the disc to the loading effect of ice, piezoelectric transducer means rigidly connected to the inner surface of said disc, and means for causing said transducer means and said disc to vibrate in system resonance.

3. In an ice detector, the combination of a substantially rigid beryllium disc tapering from a larger outer surface to a smaller inner surface at its inner end, means mounting said disc to subject the outer surface of the disc to the loading effect of ice, a stack of ammonium dihydrogen phosphate crystal plates rigidly connected to the inner end of said disc, and means for causing said crystal plates and disc to vibrate in system resonance.

4. In an ice detector, the combination of a substantially rigid beryllium disc tapering from a larger outer surface to a smaller inner surface, means mounting said disc to subject the outer surface of the disc to the loading effect of ice, piezoelectric crystal means having a rigid connection at one end to the inner end of said disc, a terminating equivalent quarter-wave bar having a rigid connection to the opposite end of said crystal means, and means for causing said crystal means, said disc and said terminating bar to vibrate in system resonance.

5. In an ice detector, the combination of a substantially rigid beryllium disc tapering from a larger outer surface to a smaller inner surface at its inner end, means mounting said disc to subject the outer surface of the disc to the loading effect of ice, a first assembly of adjacent quartz strips attached to the inner end of the disc, a stack of ammonium dihydrogen phosphate crystal plates secured at one end to said first assembly of quartz strips, a second assembly of quartz strips secured to the opposite end of said stack of crystal plates, the length dimension of the quartz strips of both said first and second assemblies extending parallel to the thickness dimension of said crystal plates, a rigidly supported thin sheet of metal secured at one side to said second quartz strip assembly, an equivalent quarter-wave terminating bar attached to the opposite side of said metal sheet, said metal sheet supporting the system consisting of the second quartz strip assembly, the stack of crystal plates, the first quartz strip assembly, the disc and the terminating bar, means for causing said system to resonate, and rigidly supported members having substantial compliance in the direction in which said system resonates engaging said terminating bar in spaced relation from said metal sheet.

6. In a device for detecting the accretion of ice on an extended surface, the combination of a vibrating member affixed to a bounded area which forms a smooth continuation of said extended surface and which is also exposed to the formation of ice and which closely simulates the surface contour and thermal properties of said first-mentioned extended surface, and a vibrating unit connected to said member and having its vibration responsive to the accretion of ice on said exposed bounded area.

7. In a device for detecting the accretion of ice on an extended surface, the combination of a vibrating member affixed to a bounded area which forms a smooth continuation of said extended surface and which closely simulates the surface contour and thermal properties of said extended surface, a disc of a material having a high velocity of sound attached to said bounded area to be subjected to the loading effect of ice on said bounded area, electromechanical transducer means connected to said disc, and means for resonating the system formed by said transducer means, said disc and the ice load on said bounded area to which the disc is attached.

8. In a device for detecting the accretion of ice on an extended surface, the combination of a tapered beryllium disc affixed to a bounded area which forms a smooth continuation of said extended surface and which closely simulates the surface contour and thermal properties of said extended surface, said disc presenting a larger outer face attached to said area to be subjected to the loading effect of ice on said bounded area, said disc tapering inwardly away from its outer face to a smaller inner face, a stack of ammonium dihydrogen phosphate crystal plates rigidly connected to the inner face of said disc, and means for causing the system formed by said crystal plates, said disc and the ice load on said bounded area to which the disc is attached to resonate.

9. In a device for detecting the accretion of ice on an extended surface, the combination of a tapered beryllium disc affixed to a bounded area which forms a smooth continuation of said extended surface and which closely simulates the surface contour and thermal properties of said extended surface, said beryllium disc presenting a larger outer face attached to said bounded area to be subjected to the loading effect of ice on said bounded area, said disc tapering inwardly away from its outer face, a first assembly of quartz strips attached to the inner end of the disc, a stack of ammonium dihydrogen phosphate crystal plates secured at one end to said first assembly of quartz strips, a second assembly of quartz strips secured to the opposite end of said stack of crystal plates, the length dimension of the quartz strips of both said first and second assemblies extending parallel to the thickness dimension of said crystal plates, a rigidly supported thin sheet of metal secured at one side to said second quartz strip assembly, an equivalent quarter-wave terminating bar attached to the opposite side of said metal sheet, said metal sheet supporting the system consisting of the second assembly of quartz strips, the stack of crystal plates, the first assembly of quartz strips, the disc and the terminating bar, means for causing said system to resonate, and rigidly supported members having substantial compliance in the direction in which said system resonates engaging said terminating bar in spaced relation from said metal sheet.

10. In an ice detector, the combination of a pair of vibrating units one of which comprises a substantially rigid beryllium disc tapering from a larger outer surface to a smaller inner surface, means mounting said disc to subject the outer surface of the disc to the loading effect of ice, piezoelectric crystal means having a rigid connection at one end to the inner surface of said disc, a terminating equivalent quarter-wave bar having a rigid connection to the opposite end of said crystal means, the outer of said vibrating units being substantially identical to said one vibrating unit but comprising, in place of said beryllium disc, a body of a material having a much higher specific gravity than beryllium, said body having a mass equal to that of said disc by a much smaller volume and being protected from loading, a pair of electronic oscillator circuits each constructed and arranged for an oscillation frequency controlled by and responsive to the vibratory frequency of the crystal means of a respective one of said vibrating units, and means for electrically translating the oscillation frequency differences between the respective output signals of said oscillator circuits to produce a signal whose amplitude is proportional to said frequency differences.

11. In a device for detecting the accretion of ice on an extended surface, the combination of a pair of vibrating units one of which comprises a tapered beryllium disc affixed to a bounded area which forms a smooth continuation of said extended surface and which closely simulates the surface contour and thermal properties of said extended surface, said beryllium disc presenting a larger outer face attached to said bounded area to be subjected to the loading effect of ice on said bounded area, said disc tapering inwardly away from its outer face, a first assembly of quartz strips attached to the inner end of the disc, a stack of ammonium dihydrogen phosphate crystal plates secured at one end to said first assembly of quartz strips, a second assembly of quartz strips secured to the opposite end of said stack of crystal plates, the length dimension of the quartz strips of both said first and second assemblies extending parallel to the thickness dimension of said crystal plates, a rigidly supported thin sheet of metal secured at one side to said second quartz strip assembly, an equivalent quarter-wave terminating bar attached to the opposite side of said metal sheet, said metal sheet supporting the system consisting of the second assembly of quartz strips the stack of crystal plates, the first assembly of quartz strips, the disc and the terminating bar, rigidly supported members having substantial compliance in the direction substantially perpendicular to the plane of said disc engaging said terminating bar in spaced relation from said metal sheet, the other of said vibrating units being substantially identical to said one vibrating unit but comprising in place of said beryllium disc a body of lead having a mass equal to that of said disc and being out of contact with said bounded area and extended surface, a pair of electronic oscillator circuits having slightly different no-load oscillation frequencies each of said oscillator circuits being so constructed and arranged that its oscillation frequency is responsive to the vibratory frequency of the stack of crystal plates of a respective one of said vibrating units, and means for electrically translating the oscillation frequency differences between the respective output signals of said oscillator circuits to produce a signal whose amplitude is proportional to said frequency differences.

References Cited in the file of this patent

UNITED STATES PATENTS

| | | |
|---|---|---|
| 2,185,966 | Pfanstiehl | Jan. 2, 1940 |
| 2,340,992 | Siegel | Feb. 8, 1944 |
| 2,414,756 | May | Jan. 21, 1947 |
| 2,538,114 | Mason | Jan. 16, 1951 |
| 2,573,168 | Mason, et al. | Oct. 30, 1951 |
| 2,589,135 | Rafuse | Mar. 11, 1952 |

UNITED STATES PATENT OFFICE

CERTIFICATE OF CORRECTION

Patent No. 2,800,647                                        July 23, 1957

Hans George Baerwald et al.

It is hereby certified that error appears in the printed specification of the above numbered patent requiring correction and that the said Letters Patent should read as corrected below.

Column 8, line 7, for "outer" read -- other --.

Signed and sealed this 22nd day of October 1957.

(SEAL)
Attest:

KARL H. AXLINE
Attesting Officer

ROBERT C. WATSON
Commissioner of Patents